J. M. BROOKFIELD.
Mode of Forming Insulators.
No. 9,392. Reissued Sept 28, 1880.
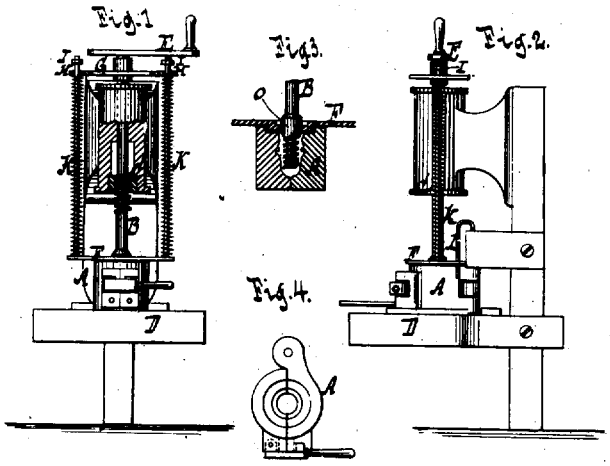
Witnesses
Otto Hufeland
William Miller
Inventor
James M. Brookfield
by
Van Santvoord & Hauff
his attorneys
THE NORRIS PETERS CO., WASHINGTON, D. C.

UNITED STATES PATENT OFFICE.

JAMES M. BROOKFIELD, OF BROOKLYN, NEW YORK.

MODE OF FORMING INSULATORS.

SPECIFICATION forming part of Reissued Letters Patent No. 9,392, dated September 28, 1880.

Original No. 103,555, dated May 31, 1870. Application for reissue filed July 31, 1880.

*To all whom it may concern:*

Be it known that I, JAMES M. BROOKFIELD, of Brooklyn, Kings county, and State of New York, have invented a new and Improved Mode of Forming Glass Insulators; and I do hereby declare the following to be a full, clear, and exact description thereof, which will enable others skilled in the art to make and use the same, reference being had to the accompanying drawings, forming part of this specification.

This invention relates to an improved mode of constructing glass insulators with internal screw-threads for securing them to their supports on the telegraph-poles; and it consists in forming the said threads by screwing a screw-threaded former into the glass while in the mold by which the exterior shape is formed and while the glass is in a plastic state, the said former at the same time forming the socket in the glass.

My invention relates, also, to certain improvements in machinery by which the article is made, and will be specified more particularly hereinafter.

Figure 1 represents a front elevation, partly in section, of a machine showing one arrangement of means for operating the former. Fig. 2 is a side elevation of the same. Fig. 3 is a section through the mold or die and follower, showing the former when screwed into the glass; and Fig. 4 is a plan view of the mold or die used for giving the exterior shape to the insulators and holding the glass while the action of the former is taking place.

Similar letters of reference indicate corresponding parts.

Glass insulators are now formed in respect to their exterior shape and with smooth sockets by placing the molten glass in the two-part hinged flasks or molds A, and forcing a smooth former into the molten glass from the top, the said molds being open thereat and charged with a sufficient quantity for one insulator by pouring it in at the said opening. I now propose to form the screw-threads, by which the insulators are screwed onto the supporting-studs, at the same time the exterior shape is produced and the socket formed, by means of a screw-threaded mandrel or shaft, B, having at its lower end a former for forming the socket in the glass, including the internal screw-thread in the deeper part of the socket. The mandrel is arranged in a suitable screw-threaded support, C, and is provided with suitable means for screwing the former down into and out of the glass while in the mold or die and under the former, wholly forming the socket by the screw-threaded former; and to this end I provide a table, D, for the mold or die A, a support, C, for the mandrel, with screw-threads of the same pitch as those on the former, and so arranged relatively to the table that the mold or die may be placed under it to receive the former in the center of the glass while the latter is in a plastic state.

The former is provided, above its screw-thread, with an enlargement, O, for forming that part of the socket of the insulator which is between its screw-thread and its mouth. The enlargement O has a smooth surface, and is preferably of conical form.

I provide, as one means of turning the former a crank, E, on the top of the shaft of the former; or, in another arrangement, I place a bevel-wheel on the said shaft, and gear with it another and larger bevel-wheel on a horizontal shaft provided with a driving-crank.

F is a follower, suspended by rods H H from a bar, G, mounted on the mandrel or shaft of the former at the upper end of the shaft. The bar G moves up and down with the shaft. The rods H go through holes in the ends of the bar G, and have adjusting-nuts I I on their upper ends, above the bar G.

The rods H H have springs K arranged upon them, resting on the follower. The bar G, in descending with the mandrel or shaft and its former, bears on the springs K K and forces the follower down on the mold or die with a yielding pressure. The follower is provided with an opening, as shown in Fig. 3, through which the former passes.

When the former is screwed out of the insulator the follower will be raised by the bar G and rods H H sufficiently to allow the mold or die A to be moved under the former, and when the latter is screwed down a short distance the follower will assume the position on the mold or die represented in Fig. 3, to resist the tendency of the glass to flow upward as the former continues to screw into it, the springs at the same time pressing down thereon with a yielding pressure and their force increasing as the former goes down.

L represents guides for the follower. The follower tends to prevent the glass from being forced over the top of the mold or die, and gives shape to the bottom of the insulator. The follower F and the former are allowed to remain until the glass solidifies, and are then withdrawn.

What I claim as new, and desire to secure by Letters Patent, is—

1. The combination of divided die A, constructed as shown, with a screw-threaded mandrel, B, provided with a former threaded on its lower end, as described, so that the insulator will be threaded in its center, while the divided die will allow of its removal, notwithstanding its irregular external form.

2. The mode, substantially as above described, of making screw-threaded glass insulators, consisting in making the socket and forming a screw-thread therein simultaneously by means of a screw-threaded former, which is screwed into the glass while in a plastic state in the mold or die, wholly forming the socket and the screw-thread therein by said former at one operation.

3. The mode of forming the sockets and the internal screw-thread in the sockets of glass insulators simultaneously with the formation of the exterior shape in the mold or die A, by means of a screw-threaded former arranged to be screwed into the glass while in a plastic state in the mold, and afterward screwed out of the same, all substantially as specified.

4. The combination of the screw-threaded former at the end of the screw-threaded mandrel or shaft B, the mold A, and the follower F, the former working through the follower, and the follower coming down on the mold to form the bottom of the insulator, substantially as described.

In testimony whereof I hereunto set my hand and seal this 26th day of July, 1880.

J. M. BROOKFIELD. [L. S.]

Witnesses:
J. VAN SANTVOORD,
J. HERMANN WAHLERS.